United States Patent
Yamaguchi

(10) Patent No.: US 7,037,565 B2
(45) Date of Patent: May 2, 2006

(54) OPTICAL RECORDING MEDIUM AND OPTICAL RECORDING METHOD

(75) Inventor: Masataka Yamaguchi, Tsurugashima (JP)

(73) Assignee: Pioneer Corporation, Tokyo (JP)

(*) Notice: Subject to any disclaimer, the term of this patent is extended or adjusted under 35 U.S.C. 154(b) by 0 days.

(21) Appl. No.: 10/439,189

(22) Filed: May 16, 2003

(65) Prior Publication Data

US 2004/0033328 A1    Feb. 19, 2004

(30) Foreign Application Priority Data

Aug. 16, 2002    (JP) .............................. 2002-237387

(51) Int. Cl.
*B32B 3/02* (2006.01)

(52) U.S. Cl. ................ 428/64.1; 428/64.4; 430/270.12

(58) Field of Classification Search ............... 428/64.1, 428/64.4, 64.5, 457, 913; 430/270.12, 295, 430/945
See application file for complete search history.

(56) References Cited

U.S. PATENT DOCUMENTS

| | | | |
|---|---|---|---|
| 6,700,862 B1* | 3/2004 | Tsukuda et al. | 369/275.4 |
| 6,773,781 B1 | 8/2004 | Ohsawa et al. | 428/64.1 |
| 2002/0176971 A1* | 11/2002 | Ohsawa et al. | 428/195 |
| 2004/0095876 A1* | 5/2004 | Abe | 369/125 |

* cited by examiner

*Primary Examiner*—Elizabeth Mulvaney
(74) *Attorney, Agent, or Firm*—Sughrue Mion, PLLC

(57) ABSTRACT

An optical recording medium records information so that a recording density of a first recording layer 11 at the most distant part from a incidence plane of laser beam is higher than that of a second recording layer 13 at the incidence plane side.

29 Claims, 3 Drawing Sheets

OPTICAL RECORDING MEDIUM AND OPTICAL RECORDING METHOD

BACKGROUND OF THE INVENTION

1. Field of the Invention

This invention relates to an optical recording medium and an optical recording method, and more particularly to an optical recording medium having a plurality of stacked rewritable recording layers and an optical recording method for recording information on said optical recording medium.

2. Description of the Related Art

FIG. 1 shows a conventional optical recording medium. As shown in FIG. 1, the optical recording medium has a PC (polycarbonate) substrate 10, a first recording layer 11, an intermediate layer 12, a second recording layer 13 and a cover layer 14 stacked sequentially from a backside of an incidence plane of laser beam L.

Each of the first recording layer 11 and the second recording layer 13 is a rewritable layer on which a phase change layer is stacked. With use of the laser beam L irradiation, the phase change layer is heated then cooled to change its phase. The first recording layer 11 has a thick metal reflective layer stacked for improving a reflectivity against the laser beam L to gain superior rewrite characteristics. On the other hand, since the laser beam L is irradiated to the first recording layer 11 through the second recording layer 13, the second recording layer 13 has no reflective layer or a very thin reflective layer.

Therefore, if information is recorded on the first recording layer 11 and the second recording layer 13 with a same recording density, rewrite characteristics of the second recording layer 13 is inferior to rewrite characteristics of the first recording layer 11. In spite of this fact, if a recording method of recording with a same recording density on each recording layer in the same way as DVD9 (dual layer DVD-ROM) which is now in practical use, it is necessary to reduce the recording density of the first recording layer 11 corresponding to the inferior rewrite characteristics of the second recording layer 13. However, recording capacity is decreased corresponding to the reduction of the recording density.

Number of the layers composing the optical recording medium as above described is not limited to two as shown in FIG. 1. Other optical recording medium composed of three layers, four layers or the like is also acceptable. In these cases, a thick metal reflective layer is stacked at a recording layer at the most distant part from the incidence plane, but no reflective layer or a very thin reflective layer is stacked at a recording layer at the incidence plane side. Therefore, the same problem is created in the optical recording medium composed of three layers, four layers or the like.

SUMMARY OF THE INVENTION

This invention has been accomplished to solve the above described problems and an object of this invention is to provide an optical recording medium and an optical recording method for recording on the optical recording medium in order to increase recording capacity of the optical recording medium.

In order to attain the object, according to one aspect of this invention, there is provided an optical recording medium comprising a plurality of stacked rewritable recording layers for recording information with use of laser beam, whereby a recording density of a recording layer at the most distant part from an incidence plane of the laser beam is higher than that of a recording layer at the incidence plane side.

According to another aspect of this invention, there is provided a method for recording information on an optical recording medium, comprising a step of irradiating laser beam to an optical recording medium on which a plurality of rewritable recording layers are stacked to record information, whereby a recording density of a recording layer at the most distant part from an incidence plane of the laser beam is higher than that of a recording layer at the incidence plane side.

According to another aspect of this invention, there is provided a method for recording information on an optical recording medium, comprising a step of irradiating laser beam to an optical recording medium on which a plurality of rewritable recording layers are stacked to record information, wherein said information is recorded on said recording layers in respective recording densities corresponding to respective rewrite characteristics.

DESCRIPTION OF THE PREFERRED EMBODIMENT

Figure 1:
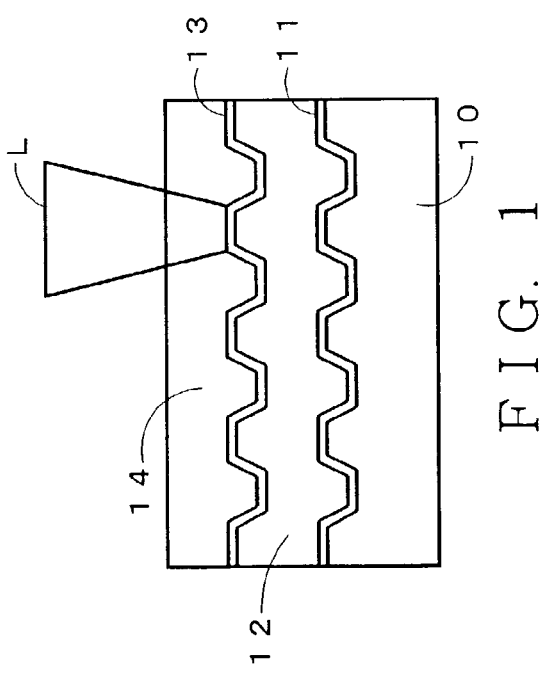
FIG. 1 is a cross-sectional view showing an optical recording medium according to one embodiment of this invention.

One embodiment of this invention will now be described with reference to the attached drawings. FIG. 1 is a cross-sectional view showing an optical recording medium employed in an optical recording method according to one embodiment of this invention. As shown in FIG. 1, the optical recording medium has a PC (polycarbonate) substrate 10, a first recording layer 11, an intermediate layer 12, a second recording layer 13 and a cover layer 14 stacked sequentially from a backside of an incidence plane of laser beam L.

Each of the first recording layer 11 and the second recording layer 13 is a rewritable layer on which a phase change layer is stacked. With use of the laser beam L irradiation, the phase change layer is heated then cooled to change its phase. The first recording layer 11 has a thick metal reflective layer stacked for improving a reflectivity against the laser beam L to gain superior rewrite characteristics. On the other hand, since the laser beam L is irradiated to the first recording layer 11 through the second recording layer 13, the second recording layer 13 has no reflective layer or a very thin reflective layer.

According to the embodiment of this invention, an optical recording medium records information so that a recording density of the first recording layer 11 is higher than that of the second recording layer 13.

Since the recording density of the first recording layer 11 having rewrite characteristics superior to rewrite characteristics of the second recording layer 13 is higher than that of the second recording layer 13 in this manner, recording capacity of the optical recording medium can be increased as much as a difference between the high and low recording densities with which the first recording layer 11 records. The low recording density here is corresponding to the inferior rewrite characteristics of the second recording layer.

Figure 2:
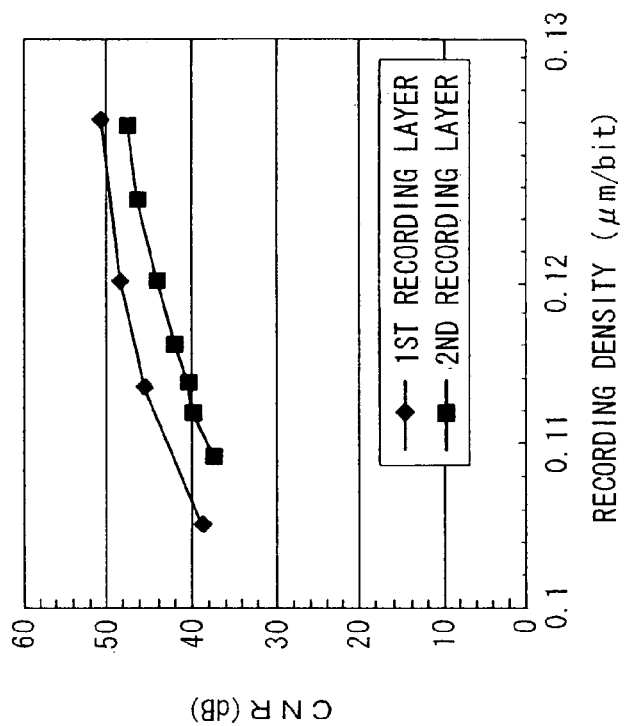
FIG. 2 is a diagram showing respective relationships between a recording density and CNR (Carrier to Noise ratio) of a first recording layer 11 and between a recording density and CNR of a second recording layer 13.

FIG. 2 is a measurement result showing respective relationships between the recording density and CNR (Carrier to Noise ratio) of the first recording layer 11 and between the recording density and CNR of the second recording layer 13. Resultingly, even if the recording density of the first recording layer 11 is about 10% higher than the recording density of the second recording layer 13, CNR of the first recording layer 11 is substantially same as CNR of the second recording layer 13. Then, after measuring CNRs of various optical recording mediums, it has turned out that when the recording density of the second recording layer 13 is at 80% or more but less than 100%, preferably at 85% or more but at or less than 95% of the recording density of the first recording layer 11, information can be recorded with maximum recording densities on the first recording layer 11 and the second recording layer 13 respectively.

Figure 3:
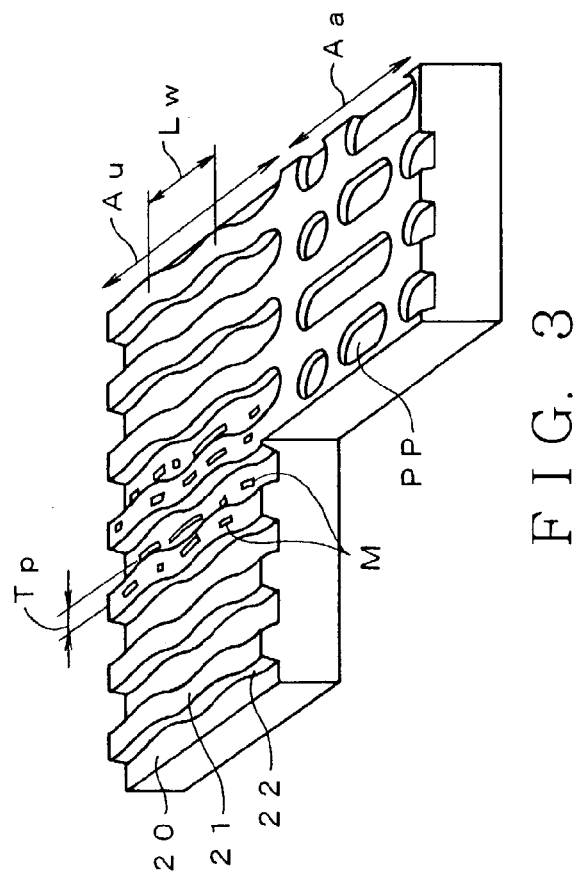
FIG. 3 is a schematic diagram of an optical recording medium according to a first embodiment of this invention.

A detailed structure of the optical medium according to a first embodiment of this invention will describe below with reference to FIG. 3. Information can be recorded on the optical recording medium of the first embodiment with use of laser beam irradiation along a track provided spirally from an inner periphery to an outer periphery of the each track of both the first recording layer 11 and the second recording layer 13. Additionally, a wavelength lambda of the laser beam is 405 nm and a numerical aperture of an objective lens of an optical pick up is 0.85 in this case.

Said track is divided into a plurality of zones. Additionally, as shown in FIG. 3, an address information domain Aa is formed at a head of each zone, and a user data domain Au is formed in a part following this address information domain Aa. A pre-pit PP, on which address information for positioning when recording is embedded, is provided at the address information domain Aa.

Further, a groove track 20 for guiding the laser beam L and a land track 21 provided between the groove tracks 20 are formed on the user data domain Au. Any one of the groove track 20 and the land track 21, or both of them is marked a recording mark M by irradiation of the laser beam L, namely, information is recorded on the first recording layer 11 and the second recording layer 13. Therefore, the track to be marked the recording mark M is equivalent to a recording track of the claims in this invention.

In the first embodiment, each track pitch as a distance between the groove track 20 and the land track 21 of the first recording layer 11 and the second recording layer 13 is the same.

Moreover, a wobble 22 is formed at the user data domain Au by both sides of the groove track 20 in a meandering shape. A recording apparatus for the optical recording medium as described below controls a rotation by keeping a frequency of a wobble signal generated by the wobble 22.

Namely, a length Lw of one cycle of the wobble 22 indicates linear velocity information of the laser beam L relative to the groove track 20 or the land track 21. The longer the length Lw of the wobble 22 formed on the groove track 20 or the land track 21 is, the higher linear velocity the recording mark M is marked at. And the shorter the length Lw of the wobble 22 formed on the groove track 20 or the land track 21 is, the lower linear velocity the recording mark M is marked at.

In the optical recording medium according to the first embodiment, the recording linear velocity of the first recording layer 11 is slower than that of the second recording layer 13. Namely, The length of the record mark M recorded on the first recording layer 11 is shorter than that of the record mark M recorded on the second recording layer 13 per amount of information.

Generally, when the optical recording medium is controlled to rotate at a constant linear velocity (CLV), every wobble 22 provided at the track from the inner periphery to the outer periphery of the track should have the same length Lw of one cycle. In this embodiment, the length Lw of one cycle of each wobble 22 formed at the first recording layer 11 is shorter than the length Lw of one cycle of each wobble 22 formed at the second recording layer 13.

On the other hand, when the optical medium is controlled to rotate at a constant angular velocity (CAV), the wobble 22 is generally so formed that the outer periphery the wobble 22 is formed at, the longer the length Lw of one cycle of the wobble 22. In this embodiment, an average Lwave of lengths of cycles of wobbles formed at the first recording layer 11 is shorter than that of lengths of cycles of the second recording layer 13.

If the length of one cycle of the wobble 22 is designed in this manner, the recording densities of the first recording layer 11 and the second recording layer 13 can be different from each other by recording with a conventional recording apparatus which controls to rotate the optical medium at a constant frequency of the wobble signal.

Figure 4:
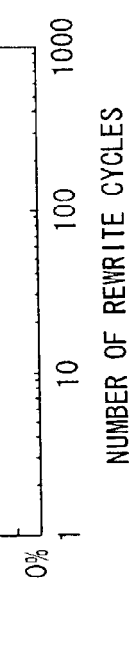
FIG. 4 is a diagram showing respective relationships between number of rewrite cycles and jitter ratio of the first recording layer 11 and between number of rewrite cycles and the second recording layer 13 according to a conventional recording method.

A concrete example will be given below concerning the effect of the first embodiment. Suppose there is an optical recording medium having a recording capacity of 21.5 GB per layer when information is recorded conventionally on both the first recording layer 11 and the second recording layer 13 of the optical recording medium at the same linear velocity. Resultingly, the recording capacity of the optical recording medium is 43 GB for two layers. FIG. 4 is a diagram showing each relationships between number of rewrite cycles and jitter ratio of the first recording layer 11 and between number of rewrite cycles and the second recording layer 13. As shown in FIG. 4, the jitter ratio of the second recording layer 13 is controlled to be about 7% and is less than tolerance level. On the other hand, the jitter ratio of the first recording layer 11 is about 5% and is suppressed beyond necessity.

Figure 5:
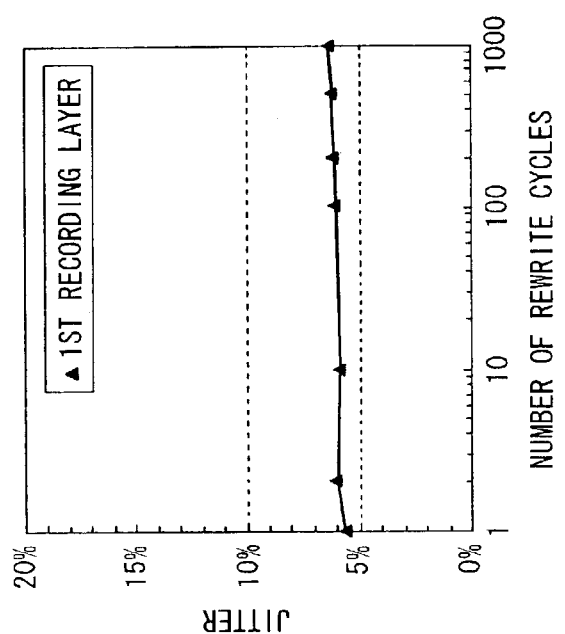
FIG. 5 is a diagram showing a relationship between number of rewrite cycles and jitter ratio of the first recording layer 11 according to the first embodiment of this invention.

On the other hand, as shown in FIG. 5, when the optical recording medium records on the first recording layer 11 at a linear velocity of about 10% lower than that of above example, the jitter ratio of the first recording layer 11 is about 6% throughout the range 1 to 1000 of number of rewrite cycles. This jitter ratio of the first recording layer 11 is about 1% higher than that in FIG. 4, but is within a tolerance level. In this case, total recording capacity of the optical recording medium is 44.8 GB, and is 1.8 GB more than the recording capacity of the optical recording medium recording at the same recording density. This 1.8 GB is equivalent to about 52 minutes in DVD format.

In the first embodiment, the fact that the higher the linear velocity when recording is, the better the jitter against number of rewrite cycles is, and resultingly the rewriting characteristics is improved. Thus, both the first recording layer 11 and the second recording layer 13 can obtain respective optimum rewriting characteristics and respective optimum recording capacities.

Additionally, in the first embodiment, a number of zones on the first recording layer 11 is greater than that on the second recording layer 13. Namely, a number of pre-pits PP of the first recording layer 11 is greater than that of pre-pits PP of the second recording layer 13. Thus, recording capacities of each zone corresponding to each address information can be the same. Thus, even if the recording densities of the first recording layer 11 and the second recording layer 13 are different from each other, information can be recorded on the optical recording medium by the conventional recording apparatus.

Another structure of the optical recording medium according to a second embodiment of this invention will be explained below with reference to FIG. 6. Information can be recorded on an optical recording medium of the second embodiment by laser beam irradiation along a track provided spirally from an inner periphery to an outer periphery of the each track of both the first recording layer 11 and the second recording layer 13.

Figure 6:
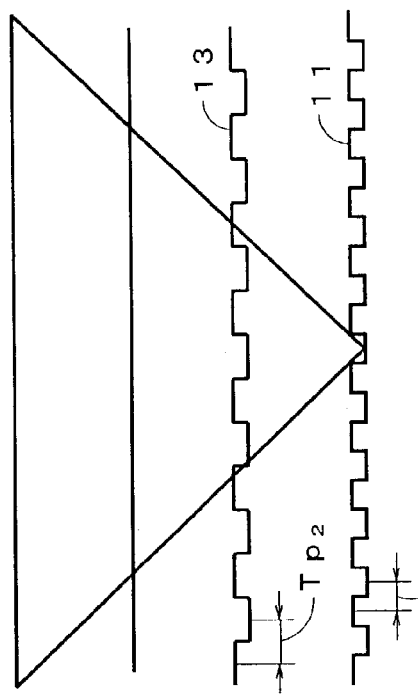
FIG. 6 is a schematic diagram showing an optical recording medium according to a second embodiment of the present invention.

Additionally, as shown in FIG. 6, a track pitch Tp1 provided at the first recording layer 11 is smaller than a track pitch Tp2 provided at the second recording layer 13 in the optical recording medium of the second embodiment. Additionally, in the second embodiment, the linear velocities of the first recording layer 11 and the second recording layer 13 are the same.

Because the track pitch Tp1 of the first recording layer 11 is smaller than the track pitch Tp2 of the second recording layer 13 in this manner, the recording density of the first recording layer 11 can be higher than that of the second recording layer 13. In the second embodiment, the fact that the larger the track pitch is, the larger a margin of tilting the optical recording medium is and resultingly the rewriting characteristics is improved. Thus, both the first recording layer 11 and the second recording layer 13 can obtain respective optimum rewriting characteristics and respective optimum recording capacities.

Additionally, in the second embodiment, like the first embodiment, the number of the zones provided at the first recording layer 11 is greater than that of the zones provided at the second recording layer 13. Namely, the number of pre-pits PP of the first recording layer 11 is greater than that of the second recording layer 13.

Figure 7:
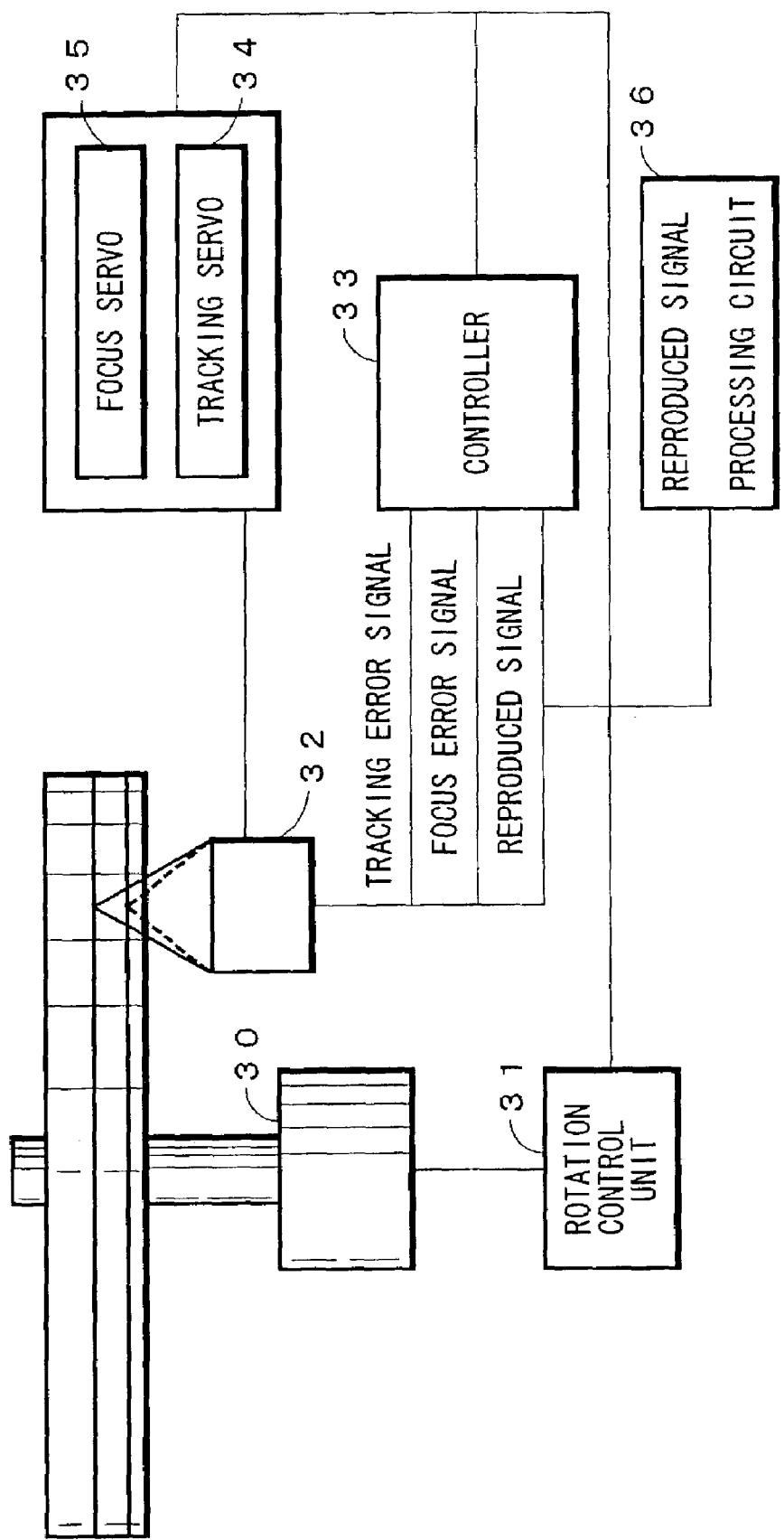
FIG. 7 is a schematic view showing a recording apparatus.

Next, an optical recording method for recording on the optical recording medium such as shown in the first and second embodiments with a recording apparatus as shown in FIG. 7 will be explained. Additionally, the recording apparatus as explained below is capable of not only recording information on the optical recording medium, but also reproducing information recorded on the optical recording medium.

In the recording apparatus, the optical recording medium is controlled to rotate at a predetermined velocity by a spindle motor 30. Additionally, the spindle motor 30 is driven by a later-described rotation control unit 31 to rotate the optical recording medium at the predetermined rotational velocity.

The optical recording medium is irradiated with a power-controlled laser beam emitted from an optical pickup 32 of the recording apparatus. The laser beam reflected by the optical recording medium has information about the groove track 20, the land track 21, the wobble 22, and the address information recorded on the pre-pit PP. A light detector unit (not shown) of the optical pickup 32 is irradiated with the reflected laser beam.

The light detector unit includes such as a beam splitter detector and other components, and generates a focus error signal, a tracking error signal and a reproduced signal when reproducing from the reflected laser beam by photoelectric conversion and current-voltage conversion. The focus error signal, the tracking error signal, and the reproduced signal are supplied to a controller 33 for controlling a whole recording apparatus. The reproduced signal is also supplied to a reproduced signal processing circuit 36 to reproduce the reproduced signal.

The controller 33 generates a tracking control signal for controlling an objective lens (not shown) of the optical pickup 32 in order that an irradiation position of the laser beam L is in a center of the desired groove track 20 or land track 21 based on the supplied tracking error signal, and then supplies the tracking control signal to a tracking servo 34.

The tracking servo 34 drives the objective lens of the optical pickup 32 according to the supplied tracking control signal, so that the laser beam L is irradiated along the groove track 20 or the land track 21.

Additionally, the controller 33 generates a focus control signal for controlling the objective lens of the optical pickup 32 in order that a focus position of the laser beam L is in a desired position of the first recording layer 11 or the second recording layer 13 based on the focus error signal, and then supplies the focus control signal to a focus servo 35.

The controller 33 generates a focus control signal for controlling the objective lens of the optical pickup 32 in order that the focus position of the laser beam L is moved from the first recording layer 11 to the second recording layer 13 or from the second recording layer 13 to the first recording layer 11 based on the address information recorded at the pre-pit PP which is read out from the tracking error signal, and then supplies the focus control signal to a focus servo 35.

The focus servo 35 drives the objective lens of the optical pickup 32 according to the supplied focus control signal, so that the focus position of the laser beam L is moved to the desired first recording layer 11 or second recording layer 13.

Moreover, the controller 33 generates a wobble signal from the tracking error signal, and generates a rotation control signal for controlling the spindle motor 30 in order that a frequency of the wobble signal becomes a predetermined frequency, and then supplies the rotation control signal to the rotation control unit 31. The rotation control unit 31 drives the spindle motor 30 according to the supplied rotation control signal, so that the rotational velocity of the optical recording medium is controlled to the rotational velocity according to the wobble 22 on the optical recording medium.

By recording with the recording apparatus as above described according to the first and the second embodiments, the recording density of the first recording layer 11 can be higher than that of the second recording layer 13.

Incidentally, in the first embodiment, linear velocities of the first recording layer 11 and the second recording layer 13 are varied, so that the recording densities of the first recording layer 11 and the second recording layer 13 are varied. Additionally, in the second embodiment, track pitches of the first recording layer 11 and the second recording layer 13 are varied, so that the recording densities of the first recording layer 11 and the second recording layer 13 are varied.

However, it is also acceptable that the recording densities are varied by varying both the line velocities and the track pitches of the first recording layer 11 and the second recording layer 13.

Further, above described embodiment is applied to the optical recording medium composed of two layers. However, this invention can be applied to the optical recording medium composed of three layers, four layers or the like. In a case of the optical recording medium composed of three layers or the like, a relation between the recording layer at the most distant part from the incident plane of the laser beam and the recording layer at the incidence plane side is equivalent to the above described relation between the first recording layer 11 and the second recording layer 13.

Although this invention has been fully described by way of examples with reference to the accompanying drawings, it is to be noted that various changes and modifications can be made in a scope of this invention. Features of this invention are summarized as follows.

The optical recording medium as shown in this embodiment is, in short, the optical recording medium comprising the stacked rewritable first recording layer 11 and second recording layer 13 for recording information with use of the laser beam L, wherein the recording density of the first recording layer 11 at the most distant part from the incidence plane of the laser beam L is higher than that of the second recording layer 13 at the incidence plane side.

Therefore, if using the recording apparatus which records information according to the linear velocity information, it is possible that the recording density of the first recording layer 11, which has a thick reflective layer and has rewrite characteristics superior to rewrite characteristics of the second recording layer 13, is higher than that of the second recording layer 13. Thus, recording capacity of the optical recording medium can be increased as much as a difference between the high and low recording densities with which information is recorded on the first recording layer 11 records. Here, the low recording density is corresponding to the inferior rewrite characteristics of the second recording layer 13.

Moreover, above described embodiments show, in short, a method for recording the optical recording medium, comprising a step of irradiating laser beam L to the optical recording medium on which a plurality of rewritable recording layers (the first recording layer 11 and the second recording layer 13) are stacked to record information, whereby the recording density of the first recording layer 11 at the most distant part from the incidence plane of the laser beam is higher than that of the second recording layer 13 at the incidence plane side.

Therefore, it is possible that the recording density of the first recording layer 11 having rewrite characteristics superior to rewrite characteristics of the second recording layer 13 is higher than that of the second recording layer 13. Thus, recording capacity of the optical recording medium can be increased as much as a difference between the high and low recording densities with which the first recording layer 11 records. Here, the low recording density is corresponding to the inferior rewrite characteristics of the second recording layer 13.

Furthermore, above described embodiments also shows, in short, a method for recording the optical recording medium, comprising a step of irradiating laser beam L to the optical recording medium on which a plurality of rewritable recording layers (the first recording layer 11 and the second recording layer 13) are stacked to record information, whereby information is recorded on the recording layers (the first recording layer 11 and the second recording layer 13) in respective recording densities corresponding to respective rewrite characteristics.

Therefore, it is possible that the recording density of the first recording layer 11 having rewrite characteristics superior to rewrite characteristics of the second recording layer 13 is higher than that of the second recording layer 13. Thus, recording capacity of the optical recording medium can be increased as much as a difference between the high and low recording densities with which the first recording layer 11 records. Here, the low recording density is corresponding to the inferior rewrite characteristics of the second recording layer 13.

Incidentally, the contents of Japanese Patent Application No. 2002-237387 are hereby incorporated by reference.

What is claimed is:

1. An optical recording medium comprising a plurality of stacked rewritable recording layers for recording information with use of laser beam,
   whereby a recording density of a recording layer at the most distant part from an incidence plane of the laser beam is higher than that of a recording layer at the incidence plane side, and
   wherein the recording density of the recording layer at the incidence plane side is at 80% or more but less than 100% of the recording density of the recording layer at the most distant part from the incidence plane.

2. The optical recording medium as claimed in claim 1, wherein at the time when the laser beam is irradiated along recording tracks, a linear velocity of the recording track on the recording layer at the most distant part from the incidence plane is lower than that of the recording track on the recording layer at the incidence plane side.

3. The optical recording medium as claimed in claim 2, wherein a length of a wobble formed on the recording track on the recording layer at the most distant part from the incidence plane is shorter than that of a wobble on the recording layer at the incidence plane side.

4. The optical recording medium as claimed in claim 3, further comprising pre-pits provided intermittently along the recording tracks and having address information,
   wherein a number of the pre-pits provided along the recording track on the recording layer at the most distant part from the incidence plane is greater than that of the pre-pits provided along the recording track on the recording layer at the incidence plane side.

5. The optical recording medium as claimed in claim 2, further comprising pre-pits provided intermittently along the recording tracks and having address information,
   wherein a number of the pre-pits provided along the recording track on the recording layer at the most distant part from the incidence plane is greater than that of the pre-pits provided along the recording track on the recording layer at the incidence plane side.

6. The optical recording medium claimed in claim 1, wherein at the time when the laser beam is irradiated along recording tracks, a track pitch of the recording track on the recording layer at the most distant part from the incidence plane is narrower than that of the recording track on the recording layer at the incidence plane side.

7. The optical recording medium as claimed in claim 6, further comprising pre-pits provided intermittently along the recording tracks and having address information,
   wherein a number of the pre-pits provided along the recording track on the recording layer at the most distant part from the incidence plane is greater than that of the pre-pits provided along the recording track on the recording layer at the incidence plane side.

8. The optical recording medium as claimed in claim 1, further comprising pre-pits provided intermittently along recording tracks and having address information, wherein a number of the pre-pits provided along the recording track on the recording layer at the most distant part from the incidence plane is greater than that of the pre-pits provided along the recording track on the recording layer at the incidence plane side.

9. An optical recording medium comprising a plurality of stacked rewritable recording layers for recording information with use of laser beam, whereby a recording density of a recording layer at the most distant part from an incidence plane of the laser beam is higher than that of a recording layer at the incidence plane side, and wherein the recording density of the recording layer at the incidence plane side is at 85% or more but at or less than 95% of the recording density of the recording layer at the most distant part from the incidence plane.

10. The optical recording medium as claimed in claim 9, wherein at the time when the laser beam is irradiated along recording tracks, a linear velocity of the recording track on the recording layer at the most distant part from the incidence plane is lower than that of the recording track on the recording layer at the incidence plane side.

11. The optical recording medium as claimed in claim 10, wherein a length of a wobble formed on the recording track on the recording layer at the most distant part from the incidence plane is shorter than that of a wobble on the recording layer at the incidence plane side.

12. The optical recording medium as claimed in claim 10, further comprising pre-pits provided intermittently along the recording tracks and having address information, wherein a number of the pre-pits provided along the recording track on the recording layer at the most distant part from the incidence plane is greater than that of the pre-pits provided along the recording track on the recording layer at the incidence plane side.

13. The optical recording medium as claimed in claim 11, further comprising pre-pits provided intermittently along the recording tracks and having address information, wherein a number of the pre-pits provided along the recording track on the recording layer at the most distant part from the incidence plane is greater than that of the pre-pits provided along the recording track on the recording layer at the incidence plane side.

14. The optical recording medium claimed in claim 9, wherein at the time when the laser beam is irradiated along recording tracks, a track pitch of the recording track on the recording layer at the most distant part from the incidence plane is narrower than that of the recording track on the recording layer at the incidence plane side.

15. The optical recording medium as claimed in claim 14, further comprising pre-pits provided intermittently along the recording tracks and having address information, wherein a number of the pre-pits provided along the recording track on the recording layer at the most distant part from the incidence plane is greater than that of the pre-pits provided along the recording track on the recording layer at the incidence plane side.

16. The optical recording medium as claimed in claim 9, further comprising pre-pits provided intermittently along recording tracks and having address information, wherein a number of the pre-pits provided along the recording track on the recording layer at the most distant part from the incidence plane is greater than that of the pre-pits provided along the recording track on the recording layer at the incidence plane side.

17. An optical recording medium comprising a plurality of stacked rewritable recording layers for recording information with use of laser beam, whereby a recording density of a recording layer at the most distant part from an incidence plane of the laser beam is higher than that of a recording layer at the incidence plane side, and wherein at the time when the laser beam is irradiated along recording tracks, a linear velocity of the recording track on the recording layer at the most distant part from the incidence plane is lower than that of the recording track on the recording layer at the incidence plane side.

18. The optical recording medium as claimed in claim 17, further comprising pre-pits provided intermittently along the recording tracks and having address information, wherein a number of the pre-pits provided along the recording track on the recording layer at the most distant part from the incidence plane is greater than that of the pre-pits provided along the recording track on the recording layer at the incidence plane side.

19. The optical recording medium as claimed in claim 17, wherein a length of a wobble formed on the recording track on the recording layer at the most distant part from the incidence plane is shorter than that of a wobble on the recording layer at the incidence plane side.

20. The optical recording medium as claimed in claim 19, further comprising pre-pits provided intermittently along the recording tracks and having address information, wherein a number of the pre-pits provided along the recording track on the recording layer at the most distant part from the incidence plane is greater than that of the pre-pits provided along the recording track on the recording layer at the incidence plane side.

21. An optical recording medium comprising a plurality of stacked rewritable recording layers for recording information with use of laser beam, whereby a recording density of a recording layer at the most distant part from an incidence plane of the laser beam is higher than that of a recording layer at the incidence plane side, and wherein at the time when the laser beam is irradiated along recording tracks, a track pitch of the recording track on the recording layer at the most distant part from the incidence plane is narrower than that of the recording track on the recording layer at the incidence plane side.

22. The optical recording medium as claimed in claim 21, further comprising pre-pits provided intermittently along the recording tracks and having address information, wherein a number of the pre-pits provided along the recording track on the recording layer at the most distant part from the incidence plane is greater than that of the pre-pits provided along the recording track on the recording layer at the incidence plane side.

23. An optical recording medium comprising a plurality of stacked rewritable recording layers for recording information with use of laser beam, whereby a recording density of a recording layer at the most distant part from an incidence plane of the laser beam is higher than that of a recording layer at the incidence plane side, and further comprising pre-pits provided intermittently along recording tracks and having address information, wherein a number of the pre-pits provided along the recording track on the recording layer at the most distant part from the incidence plane is greater than that of the pre-pits provided along the recording track on the recording layer at the incidence plane side.

24. An optical recording medium comprising:

an outer surface on which a beam is irradiated;

a first recording layer on which first information is recorded via the beam; and a second recording layer on which second information is recorded via the beam, wherein the first recording layer is located further from the outer surface than the second recording layer, wherein a first recording density of the first recording layer is higher than a second recording density of the second recording layer, wherein the first recording layer comprises a first track having a first wobble with a first cycle, wherein the second recording layer comprises a second track having a second wobble with a second cycle, and wherein the first cycle has a first cycle length that is different than a second cycle length of the second cycle.

25. The optical recording medium as claimed in claim 24, wherein the first cycle length is less than the second cycle length.

26. The optical recording medium as claimed in claim 25, wherein the first track has a first track pitch and the second track has a second track pitch, and the first track pitch is smaller than the second track pitch.

27. An optical recording medium comprising:

an outer surface on which a beam is irradiated;

a first recording layer on which first information is recorded via the beam; and a second recording layer on which second information is recorded via the beam, wherein the first recording layer is located further from the outer surface than the second recording layer, wherein a first recording density of the first recording layer is higher than a second recording density of the second recording layer, wherein the first recording layer comprises a first track having first wobbles, wherein the second recording layer comprises a second track having second wobbles, and wherein an average first cycle length of the first wobbles is less than an average second cycle length of the second wobbles.

28. An optical recording medium comprising:

an outer surface on which a beam is irradiated;

a first recording layer on which first information is recorded via the beam; and a second recording layer on which second information is recorded via the beam, wherein the first recording layer is located further from the outer surface than the second recording layer, wherein a first recording density of the first recording layer is higher than a second recording density of the second recording layer, wherein the first recording layer comprises a first track having a first track pitch, wherein the second recording layer comprises a second track having a second track pitch, and wherein the first track pitch is different than the second track pitch.

29. The optical recording medium as claimed in claim 28, wherein the first track pitch is smaller than the second track pitch.

* * * * *